United States Patent [19]
Nakajima

[11] Patent Number: 5,878,782
[45] Date of Patent: *Mar. 9, 1999

[54] SWITCHING VALVE

[75] Inventor: Shigeru Nakajima, Aichi-pref, Japan

[73] Assignee: Aisin Seiki Kabushiki Kaisha, Aichi-pref, Japan

[*] Notice: This patent issued on a continued prosecution application filed under 37 CFR 1.53(d), and is subject to the twenty year patent term provisions of 35 U.S.C. 154(a)(2).

[21] Appl. No.: 703,873

[22] Filed: Aug. 27, 1996

[30] Foreign Application Priority Data

Sep. 13, 1995 [JP] Japan ..................................... 7-235256

[51] Int. Cl.[6] .................................................. F15B 13/044
[52] U.S. Cl. .................................. 137/625.65; 137/625.68
[58] Field of Search ........................... 137/625.65, 625.68

[56] References Cited

U.S. PATENT DOCUMENTS

| | | | |
|---|---|---|---|
| 4,664,152 | 5/1987 | O'Mara | 137/625.68 |
| 4,809,749 | 3/1989 | Ichihashi | 137/625.65 |
| 5,036,885 | 8/1991 | Miura | |
| 5,117,869 | 6/1992 | Kolchinsky | 137/625.65 |
| 5,592,972 | 1/1997 | Niethammer | 137/625.68 X |

FOREIGN PATENT DOCUMENTS

| | | |
|---|---|---|
| 19504185 | 8/1996 | Germany . |
| 6-330712 | 11/1994 | Japan . |
| 7-151257 | 6/1995 | Japan . |

*Primary Examiner*—Gerald A. Michalsky
*Attorney, Agent, or Firm*—Hazel & Thomas, P.C.

[57] ABSTRACT

A switching valve has a cylindrical housing including a bore, an inlet port, a first inlet-outlet port, and a second inlet-outlet port which open to the hollow. A valve member slidably disposed in the bore has a ringed groove around its periphery. The valve member can open or block a portion between the groove and the first inlet-outlet port and a portion between the groove and the second inlet-outlet port. The groove formed outside the valve member always communicates with the inlet port and can communicate with the first and second inlet-outlet ports. A single drain port is formed within the valve member so that the single drain port can communicate with the first and second inlet-outlet ports. The valve member is caused to slide by a solenoid.

3 Claims, 3 Drawing Sheets

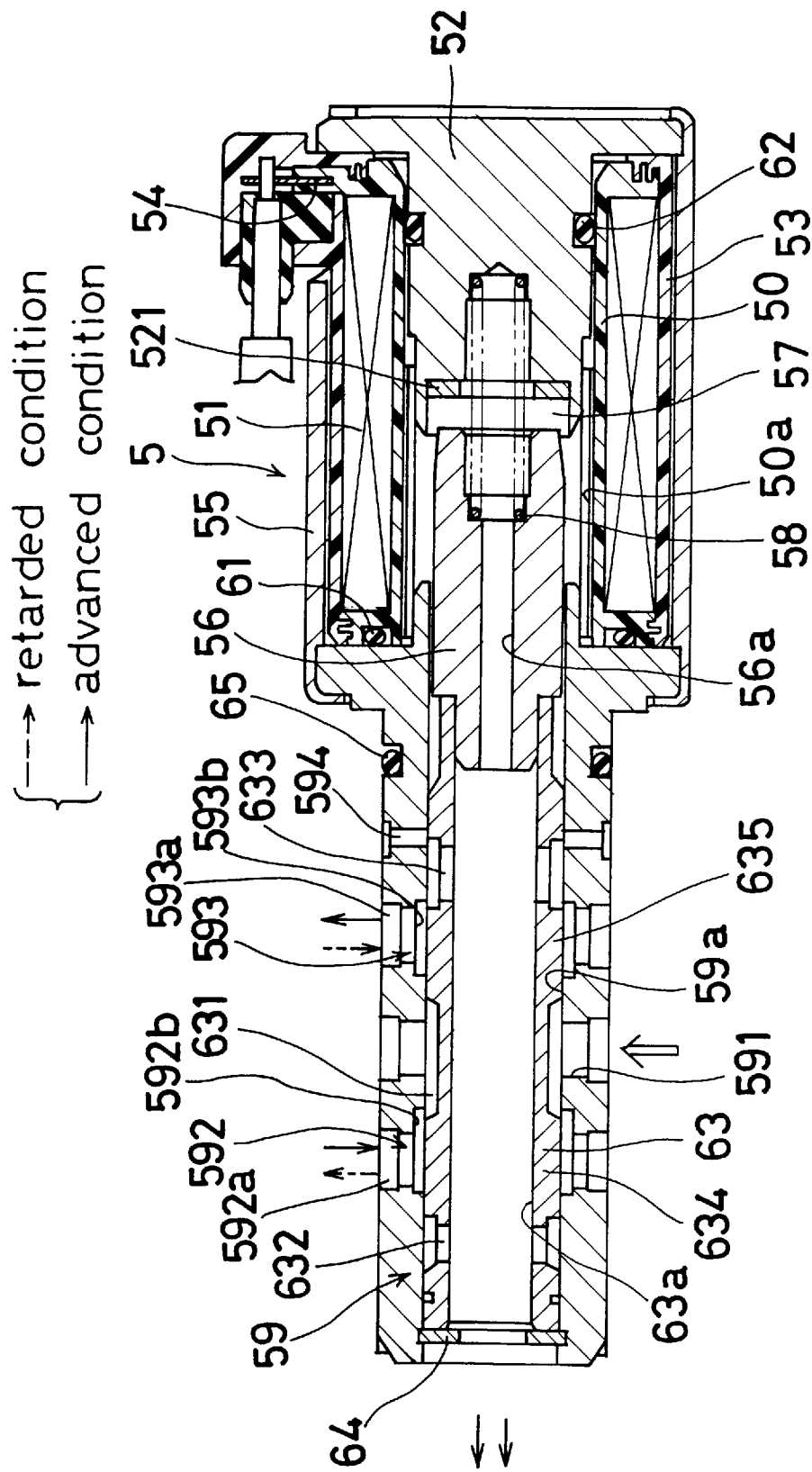

SWITCHING VALVE

FIELD OF INVENTION

This invention relates to a switching valve for a four port switching valve that can be used to control the oil pressure supplied to a variable valve timing system that makes the open-close timing of the intake or exhaust valves of an engine variable.

BACKGROUND OF THE INVENTION

A conventional four port switching valve is disclosed in, for example, Japanese patent application laid-open publications No. 6 (1994)-330712 and No. 7 (1995)-151257. This valve comprises a cylindrical housing having a bore, an inlet port, a first inlet-outlet port, a second inlet-outlet port formed in the cylindrical housing which open to the bore and a spool valve slidably disposed in the bore that can open and close off the section between the inlet port and the first inlet-outlet port and the section between the inlet port and the second inlet-outlet port. The disclosed valve also includes a first ringed groove formed around the spool valve that always opens to the inlet port and can communicate with the first and second inlet-outlet ports. Two drain ports formed in the cylindrical housing so as to open to the bore. A second ringed groove is formed around the spool valve and always opens to one of the drain ports and can communicate with the first inlet-outlet port. A third ringed groove is formed around the spool valve and opens to the other drain port and can communicate with the second inlet-outlet port.

This type of switching valve has two drain ports in the cylindrical housing, which requires many manufacturing processes and a complicated structure. In addition, because two drain ports are formed in the cylindrical housing so that the two drain ports open to the bore, pressurized fluid in the inlet-outlet ports can easily leak through the housing to the drain ports when the pressurized fluid flows from the inlet port to the inlet-outlet ports.

SUMMARY OF THE INVENTION

An object of this invention is to reduce the number of manufacturing processes and simplify the structure of switching valves.

In order to achieve this objective, there is provided a switching valve which includes a cylindrical housing having a slide bore; an inlet port, a first inlet-outlet port and a second inlet-outlet port formed in said housing and which open to said slide bore; a valve member having a groove which opens to said inlet port, the valve member axially slidably disposed in said slide bore, wherein axial movement of the valve member can open and block a portion between said groove and the first inlet-outlet port and a portion between said groove and the second inlet-outlet port; a drain port formed within said valve member and connectable to the first and second inlet-outlet ports; a first passage formed in said valve member to open to said drain port and being connectable to the first inlet-outlet port in response to the axial movement of said valve member in one direction; and a second passage formed in said valve member to open to said drain port and being connectable to the second inlet-outlet port in response to the axial movement of said valve member in the other direction.

DESCRIPTION OF THE DRAWINGS

The foregoing and additional features of the present invention will become more apparent from the following detailed description of a preferred embodiment thereof when considered with reference to the attached drawings, in which:

FIG. 3 is a sectional view of the four port switching valve in FIG. 1.

DETAILED DESCRIPTION OF THE PREFERRED EMBODIMENT

Hereinafter a switching valve according to an embodiment of the present invention is explained with reference to FIGS. 1–3.

Figure 1:
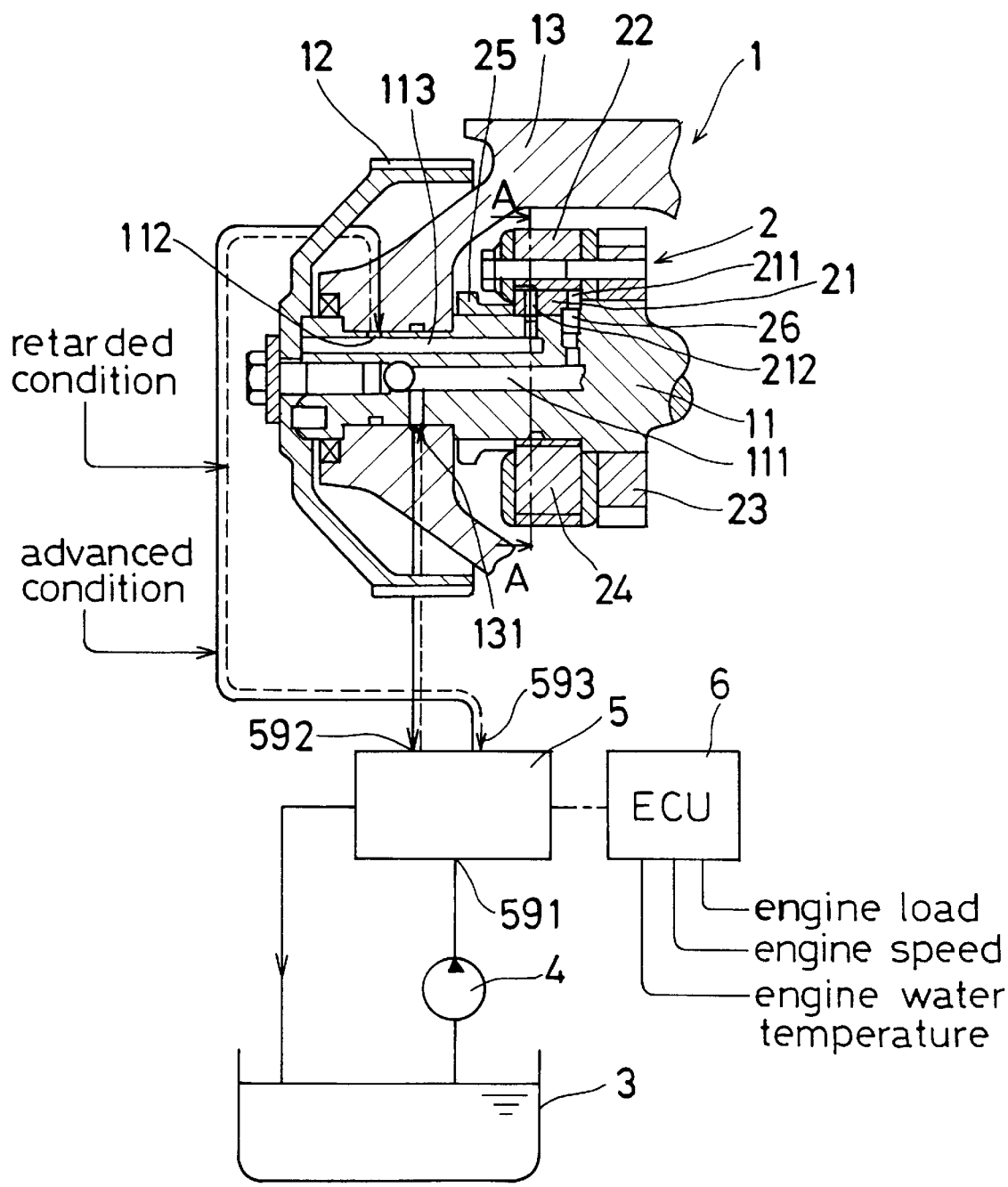
FIG. 1 is an overall view of a valve timing control device including a switching valve constructed in accordance with this invention.

With reference to FIG. 1, a valve timing control device 1 for an internal combustion engine comprises a phase changer 2 that changes the open-close timing of intake valves which open and close ports that open to the combustion chambers of the engine, an oil pan 3 filled with oil, an oil pump 4 that pumps oil from the oil pan 3 to the phase changer 2, a four port switching valve 5 constructed according to this invention that is disposed between the oil pump 4 and the phase changer 2, and an electronic control unit (ECU) 6. The ECU 6 controls the four port switching valve 5 according to information regarding the running conditions of the engine such as the engine speed, the engine load, and the engine water temperature.

The phase changer 2 attached around an exhaust valve cam shaft (EX cam shaft) 11 with an exhaust valve cam (EX cam, not shown in Figures) which opens and closes the exhaust valves (not shown in Figures). The phase changer 2 changes the rotational phase of the intake valve cam shaft (IN cam shaft, not shown in Figures) against the rotation of a timing pulley 12. The IN cam shaft has an intake valve cam that opens and closes the intake valves (not shown in Figures). The timing pulley 12 is fixed on the left end of the EX cam shaft 11 and is connected to a crank shaft (not shown in the Figures) by way of a timing belt (not shown in the Figures).

The phase changer 2 is disposed in a housing 13 that supports the EX cam shaft 11 and has a first rotor 21, a second rotor 22, a scissor gear 23, and six vanes 24. The first rotor 21 is fixed around the EX cam shaft 11 with a screw 25 and a knock pin 26, and rotates with the EX cam shaft 11. The second rotor 22 is disposed around the first rotor 21 so that the second rotor 22 can rotate against the first rotor 21. There are plural oil compartments 27 at equal intervals between the first rotor 21 and the second rotor 22. The scissor gear 23 is fixed on the second rotor 22 and rotates with it, and transmits the movement to the IN cam shaft. As shown in FIG. 2, one end of the vanes 24 is fixed on the rotor 21, and vanes 24 extend radially so that the other end of each vane contacts the second rotor 22. Each of vanes 24 divides each of the oil compartments 27 into an oil compartment 271 of the retarded direction or side, and an oil compartment 272 of the advanced direction or side. The number of the oil compartments is not limited to 6, and any number over 1 is acceptable.

A ringed oil port 131 is formed along the internal circumference of the housing 13. The oil port 131 communicates with the oil compartments 271 of the retarded side by way of a passage 111 formed inside the EX cam shaft 11 and a passage 211 formed in the first rotor 21. A ringed oil port 112 is formed on the periphery of the EX cam shaft 11. The oil port 112 communicates with the oil compartments 272 of the advanced side by way of a passage 113 formed within the EX cam shaft 11 and a passage 212 formed in the first rotor 21. In the present case, the passage 211 formed in the first rotor 21 is divided into six parts and the passage 212 is divided into six parts.

The operation of the phase changer 2 is described next.

Figure 2:
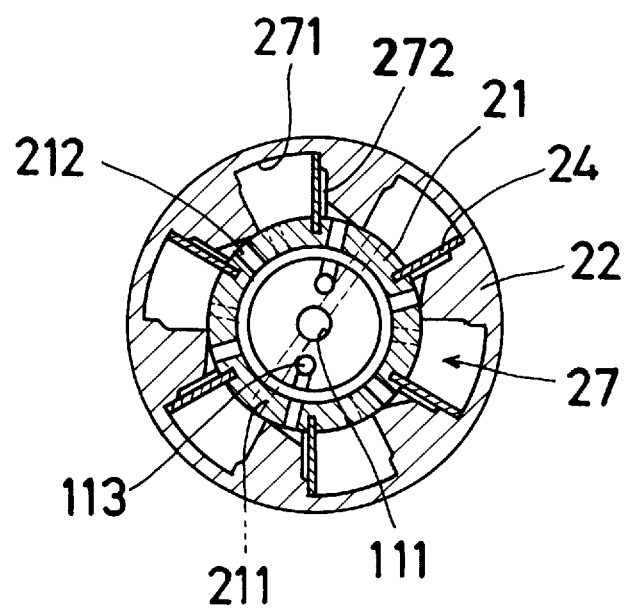
FIG. 2 is 2—2 section view of FIG. 1.

When the engine is started, the phase changer 2 assumes the most retarded position as shown in FIG. 2. The crank shaft rotates and the movement rotates the timing pulley 12 by way of the timing belt, and is transmitted to the IN cam shaft by way of the EX cam shaft 11, the first rotor 21, vanes 24, the second rotor 22, and the scissor gear 23.

When the engine speed is in a certain range (idling or high, for example), the ECU 6 controls the four port switching valve 5 so that oil pressure is supplied to the oil port 131 as the dotted line in FIG. 1 shows. Because the oil pressure is transmitted to the retarded section oil compartment 271, the vanes 24 are kept in the position in which the capacity of the retarded side of the oil compartment 271 becomes maximum, and the largest retarded angle is maintained. At that moment, the rotation power of the timing pulley 12 is transmitted to the IN cam shaft by way of the EX cam shaft 11, the first rotor 21, the vanes 24, the second rotor 22, and the scissor gear 23.

As the engine speed changes to another range (low or middle, for example), ECU 6 controls the four port switching valve 5. As the solid line in FIG. 1 shows, the oil pressure of the inlet-outlet port 112 is transmitted to the advanced side oil compartment 272 by way of passages 113, 212. The oil in the retarded side oil compartment 271 is drained out to the oil pan 3 by way of the passages 211, 111 and the port 131. With the movement of the vanes 24, the second rotor 22 rotates against the first rotor 21 to the advanced side (clockwise in FIG. 2) and stops when the largest advanced angle is attained. Therefore, the IN cam shaft rotates against the timing pulley so that it reaches the largest advanced angle. As a result, the valve timing is advanced.

When oil pressure is supplied to both the retarded side and the advanced side oil compartments 271, 272, vanes 24 stay in the middle between the retarded side and the advanced side, and the IN cam shaft also remains in the middle.

The construction of the four port switching valve 5 is described next with reference to FIG. 3.

A coil 51 is wound around a bobbin 50 made of a cylindrical non-magnetic body (resin, for example), and a fixed core 52 is disposed through a center hole 50a of the bobbin 50. A housing 53 made of non-magnetic material (resin, for example) that covers the coil 51 is fixed in the bobbin 50 as if one body. Two electrodes 54 (only one of them is shown in FIG. 3) attached to coil 51 are fixed in the housing 53. The electrodes 54 are electrically connected to the ECU 6 as shown in FIG. 1.

A yoke 55 is disposed around the housing 53. One end of the yoke 55 is fixed on the flange of a housing 59 by caulking and the other end is fixed on the fixed core 52 by caulking. A movable core 56 is slidably disposed in the center hole of the bobbin 50a. A magnetic gap 57 is formed between the movable core 56 and an attractive part 521 of the fixed core 52. When electric current is sent to the coil 51 through the electrodes 54, a magnetic circuit is formed by the coil 51, the housing 59, the movable core 56, the fixed core 52 and the yoke 55, and an attraction is generated between the movable core 56 and the fixed core 52. A spring 58 is disposed between the movable core and the fixed core 52, and pushes the movable core 56 against the magnetic attraction. The force of the spring 58 is selected so that the spring force is weaker than the magnetic attraction.

A seal member 61 is disposed between the bobbin 50 and the housing 59, and a seal member 62 is disposed between the bobbin 50 and the fixed core 52.

The housing 59 is shaped like a cylinder and has a bore 59a and a flange on one end. The housing 59 is inserted in a cylinder head (not shown in the Figures) with a clearance (not shown in the Figures). It is also possible to press the housing 59 into the cylinder head.

Four inlet ports 591 formed in a concentric circle, four first inlet-outlet ports 592 formed in a concentric circle, and four second inlet-outlet ports 593 formed in a concentric circle are arranged at intervals along the length of the housing 50. All of the ports 591, 592, and 593 open to the hollow 59a. The inlet port 591 always communicates with the oil pump 4 (shown in FIG. 1), and functions as the inlet to oil pressure. The first inlet-outlet port 592 always communicates with the retarded side oil compartment 271 by way of the port 131. The second inlet-outlet port 593 always communicates with the advanced side oil compartment 272 by way of the port 111. The first inlet-outlet port 592 has a passage 592a on the periphery and a ringed trench 592b formed along the internal circumference adjacent to the passage 592a.

A spool valve member 63 is slidably disposed in the bore 59a of the housing 59, and the movable core 56 is pressed into its right end. The leftward movement (in FIG. 3) of the valve member 63 is limited by a stopper 64 fixed in the housing 59. Within the valve member 63, a drain port 63a is axially formed. The drain port 63a always communicates with the oil pan 3 (FIG. 1). The drain port 63a can communicate with the first and second inlet-outlet ports 592, 593, and drains out the oil in the first and second inlet-outlet ports 592,593. The drain port 63a also communicates with the passage 56a of the movable core 56.

The valve member 63 has a peripheral ringed groove 631, first and second passages 632, 633, a first periphery 634 between the first passage 632 and the peripheral ringed groove 631, a second periphery 635 between the peripheral ringed groove 631 and the second passage 633.

The peripheral ringed groove 631 always communicates with the inlet port 591, and can communicate with the first and second ports 592, 593. The peripheral ringed groove 631 communicates with the first inlet-outlet port 592 when electric current is not sent to the coil 51. The groove 631 communicates with the second inlet-outlet port 593 when electric current is sent to the coil 51. The first and second passages 632, 633 always communicate with the drain port 63a. The first passage 632 communicates with the first inlet-outlet port 592 when electric current is sent to the coil 51. The second passage 633 communicates with the second inlet-outlet port 593 when electric current is not sent to the coil 51. A ringed groove is formed in the base of the flange of the housing 59 and a seal member 65 is disposed in the ringed groove to seal the portion between the housing 59 and the cylinder head. In the present embodiment, a passage 594 is formed so that one end of the passage 594 always communicates with the second passage 633, and the other end communicates with the portion between the ringed groove and the outer passage 593a. This prevents the seal member 65 from being put under excessive oil pressure by way of the clearance between the housing 59 and the cylinder head.

The first periphery 634 connects the peripheral ringed groove 631 to the first inlet-outlet port 592 and disconnects the first passage 632 from the first inlet-outlet port 592 when electric current is not sent to the coil 51. When electric current is sent to the coil 51, the first periphery 634 disconnects the peripheral ringed groove 631 from the first inlet-outlet port 592 and connects the first passage 632 to the first inlet-outlet port 592. The second periphery 635 disconnects the peripheral ringed groove 631 from the second inlet-outlet port 593, and connects the second passage 633 with the second inlet-outlet port 593 when electric current is not sent to the coil 51. When electric current is sent to the coil 51, the second periphery 635 connects the peripheral ringed trench 631 to the second inlet-outlet port 593, and disconnects the second passage 633 from the second inlet-outlet port 593.

The operation of the four port switching valve 5 is described next.

When electric current is not sent to the coil 51, the movable core 56 and the valve member 63 are pushed to the left (in FIG. 3) by the spring 58, and the valve member 63 touches the stopper 64. At this moment because the peripheral ringed groove 631 communicates with the first inlet-outlet port 592, oil supplied to the inlet port 591 by the oil pump 4 is sent to the retarded side oil compartment 271 of the phase changer 2 by way of the peripheral ringed groove 631 and the first inlet-outlet port 592. At the same time, the second inlet-outlet port 593 is connected to the drain port 63a by way of the second passage 633, and the oil in the advanced side oil compartment 272 of the phase changer 2 is drained out to the oil pan 3 by way of the second inlet-outlet port 593, the second passage 633, and the drain port 63a.

When electric current is sent to the coil 51, an attractive force is generated in the gap between the movable core 56 and the fixed core 52, and the movable core 56 and the valve member 63 move against the spring 58 to the right in FIG. 3. The peripheral ringed groove 631 communicates with the second inlet-outlet port 593 and the oil supplied to the inlet port 591 by the pump 4 is sent to the advanced side oil compartment 272 by way of the peripheral ringed groove 631 and the second inlet-outlet port 593. At the same time, the first inlet-outlet port 592 communicates with the drain port 63a by way of the first passage 632, and the oil in the retarded side oil compartment 271 is drained out to the oil pan 3 by way of the first inlet outlet port 592, the first passage 632, and the drain port 63a.

The oil sent from the first and second inlet-outlet ports 591, 592 is drained out through the single drain port 63a.

In this embodiment, because the drain port 63a which can communicate with the first and second inlet-outlet ports 592, 593 is formed within the valve member 63, the oil in the first and second inlet-outlet ports 592, 593 can be drained through a single drain port. Because only one drain port is needed, the manufacturing processes of the drain port is reduced, and the structure is simplified.

Because the number of drain ports on the cylinder head side is reduced, the number of manufacturing processes for the drain ports on the cylinder head side are also reduced.

Because the single drain port 63a is formed within the valve member 63, the amount of oil leaking to the drain port 63a is reduced to a minimum when oil under pressure flows from the inlet port 591 to the first inlet-outlet port 592, or to the second inlet-outlet port 593.

Because the second passage 633 not only connects the second inlet-outlet port 593 to the drain port 63a, but also connects an oil entrance 594 and the drain port 63a, one of the passages 633 can be omitted, and this reduces the number of manufacturing processes of the valve member 63.

Although an embodiment of the switching valve has been described with respect to use of the valve as part of a valve timing control device, the switching valve is not restricted to such uses and other uses will now become apparent to those skilled in the art.

What is claimed is:

1. A switching valve for controlling fluid pressure supplied to a first chamber and a second chamber, comprising:

a cylindrical housing having a slide bore, an inlet port, a first inlet-outlet port communicating with the first chamber and which opens to said slide bore, and a second inlet-outlet port communicating with the second chamber and which opens to said slide bore;

a valve member having a groove that opens to said inlet port, the valve member being axially and slidably disposed in said slide bore;

a drain port formed within said valve member and operatively connectable to the first and second inlet-outlet ports;

a first passage formed in said valve member for opening to said drain port;

a second passage formed in said valve member for opening to said drain port;

a movable core fixed directly at the end of said valve member;

a solenoid operatively positioned for axially sliding said valve member through said movable core in response to an electric current, said valve member being positionable, wherein said valve member includes means for selectively opening and blocking, via axial movement of said valve member, a first portion between the groove and the first inlet-outlet port, a second portion between the groove and the second inlet-outlet port, a third portion between said first passage and the first inlet-outlet port, and a fourth portion between said second passage and the second inlet-outlet port, and said valve member further includes means for switchably positioning said valve member in response to electric current supplied to said solenoid into one of a first position in which the first and fourth portions are opened and in which the second and third portions are blocked, a second position in which the second and third portions are opened, and a middle position in which the first, second, third and fourth portions are blocked.

2. A switching valve according to claim 1, further comprising a third passage formed in the housing for opening to the second passage of the valve member.

3. A switching valve according to claim 1, wherein the movable core further includes a passage which extends along the sliding direction of the movable core.

* * * * *